United States Patent [19]

Pohlig

[11] 4,241,301
[45] Dec. 23, 1980

[54] CIRCUIT ARRANGEMENT FOR THE GENERATION OF STEPPING PULSES FOR THE ACCELERATION OF A STEPPER MOTOR

[75] Inventor: Dietmar Pohlig, Munich, Fed. Rep. of Germany

[73] Assignee: Siemens Aktiengesellschaft, Berlin & Munich, Fed. Rep. of Germany

[21] Appl. No.: 902,115

[22] Filed: May 2, 1978

[30] Foreign Application Priority Data

May 11, 1977 [DE] Fed. Rep. of Germany ....... 2721240

[51] Int. Cl.³ ........................................... H02K 37/00
[52] U.S. Cl. ..................................................... 318/696
[58] Field of Search .............................. 318/685, 696

[56] References Cited

U.S. PATENT DOCUMENTS

| | | | |
|---|---|---|---|
| 3,805,138 | 4/1974 | Hilker | 318/696 |
| 3,818,261 | 6/1974 | Clarke, Jr. | 318/696 |
| 3,869,656 | 3/1975 | Kennedy et al. | 318/696 |
| 4,119,901 | 10/1978 | Leenhouts | 318/696 X |
| 4,119,902 | 10/1978 | Newell | 318/696 |

OTHER PUBLICATIONS

'Celerate' the digital stepping motor, Electronic Design 1, Jan. 4, 1973, pp. 84-87.

*Primary Examiner*—Gene Z. Rubinson
*Attorney, Agent, or Firm*—Hill, Van Santen, Steadman, Chiara & Simpson

[57] ABSTRACT

A circuit arrangement is disclosed which generates stepping pulses which will drive a stepper motor within its range of optimum load angle. The stepping pulses are formed by a few starter pulses which follow each other in short succession and a plurality of control pulses which are always initiated as soon as the rotor of the stepper motor has turned by one stepping angle. In this particular fashion the acceleration of the stepper motor is accomplished with maximum dynamic torque.

8 Claims, 4 Drawing Figures

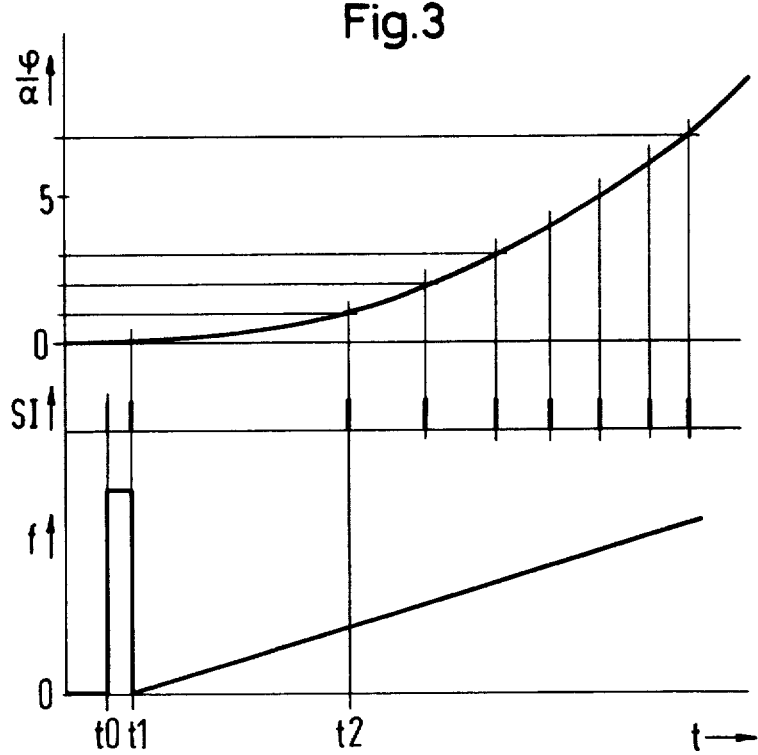
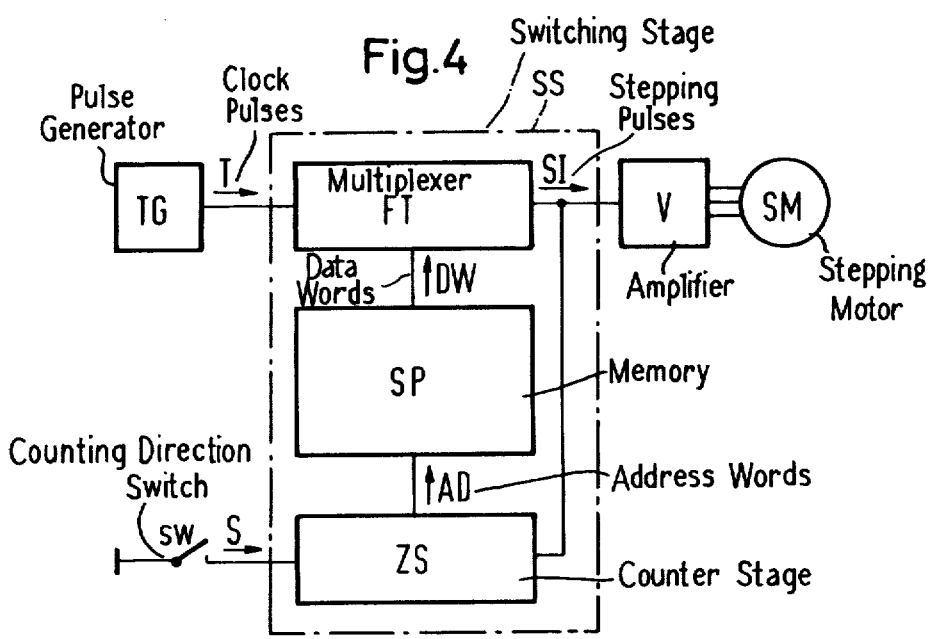

4,241,301

CIRCUIT ARRANGEMENT FOR THE GENERATION OF STEPPING PULSES FOR THE ACCELERATION OF A STEPPER MOTOR

BACKGROUND OF THE INVENTION

This invention covers a circuit arrangement for the generation of stepping pulses for the acceleration of a stepper motor where a pulse generator is employed which generates command pulses which are coordinated to the stepping pulses. An amplifier is employed which has at its input the stepping pulses and which outputs to the stepper motor the voltages corresponding to the stepping pulses.

According to a publication "*Celerate the Digital Stepping Motor*" Electronic Design 1, Jan. 4, 1973 pages 84 to 87, there is already known a circuit arrangement for the generation of stepping pulses for the drive of a stepper motor. This circuit arrangement consists of a multiplexer or frequency divider having an input which receives command pulses of a predetermined repetition rate and which generates at its output the stepping pulses. The repetition rate of the stepping pulses is equal to the product of a factor which customarily is smaller than one and the repetition rate of the command pulses. This factor is determined by data words which are fed to the multiplexer. The circuit arrangement furthermore contains a counter which can be counted up or down by means of counting pulses of predetermined repetition rate. The counter generates at its output the data words. During acceleration of the stepper motor, the counter is counting up starting with an initial counter position to a final counter position by means of counting pulses which have a repetition rate considerably smaller than the rate of the command pulses. Depending on the appropriate counter position of the counter stage, the repetition rate of the stepping pulses constantly increases due to the changing values of the data words. At the moment the counter stage reaches its final counter position, further counting is inhibited and the repetition rate of the stepping pulses is not changed any further. During deceleration of the stepper motor the counter stage is again counted downwards by means of the counter pulses. In corresponding fashion to the acceleration of the stepper motor, the repetition rate of the stepping pulses is reduced in dependence upon the respective counter position. In this known circuit arrangement the repetition rate of the stepping pulses can be adjusted such that it can be changed during acceleration and during deceleration of the stepper motor linearly, logarithmically, or exponentially. The stepper motor is, however, in this mode not operated at its optimum load angle range. In the case where stepper motors are used as drives for positioning, it is, however, frequently necessary that the time required to reach a particular position be kept at a minimum. This positioning time is shorter the higher the torque of the stepper motor. The torque is not only dependent upon the properties of the stepper motor but also on the mode of operation.

The above described counter and multiplexer of the Electronic Design 1 article are similar to the counter ZS and multiplexer FT of FIG. 4 discussed below.

SUMMARY OF THE INVENTION

This invention has as its objective to develop a circuit arrangement which will generate stepping pulses which will accelerate a stepper motor at the maximum dynamic torque possible.

In accordance with this invention objective has been reached using a circuit arrangement as mentioned above in such a fashion as to use a switching stage which will, at the beginning of acceleration, initiate for the stepping pulses at first at least one starter impulse and thereafter a plurality of control pulses generated always at the moment when the motor of the stepper motor has turned by an average of just one stepping angle. This circuit arrangement has the advantage that the stepper motor works during the entire positioning movement under the optimum load angle conditions and a positioning movement can also be accomplished in short positioning time if only a few steps are available. In this fashion the theoretical highest possible output power of the stepper motor can be fully realized.

In case the stepper motor is designed in such a fashion that half a period of the static torque characteristic corresponds to an odd number "s" of steps, it is of advantage to set the number of starting pulses equal to $(s+1)/2$.

The optimum dynamic torque value is reached quickly if the repetition rate of the start pulses is considerably greater than the repetition rate of the control pulses at the beginning of the acceleration.

In order to accomplish the quickest possible braking of the stepper motor at the maximum torque, it is desirable to initiate the braking cycle of the stepper motor by a number of stepping pulses which will bring the stepper motor immediately into the range of optimum negative load angle according to its torque characteristic.

The number and the repetition rate of the start pulses and of the control pulses is determined in the most simple way by incorporation of a memory in the switching stage which contains a control program in which number and repetition rate of the corresponding control pulses and start pulses are stored.

This switching stage requires little effort if the control program is stored in read only memory in the form of data words which determine the divider ratio which is used to divide, with the help of a multiplexer or frequency divider, the repetition rate of the command pulses generated in a pulse generator.

BRIEF DESCRIPTION OF THE DRAWINGS

FIG. 3 illustrates a time diagram of the torque angle during the acceleration of the stepper motor; and FIG. 4 illustrates a block diagram of the circuit arrangement.

DESCRIPTION OF THE PREFERRED EMBODIMENTS

Figure 1:
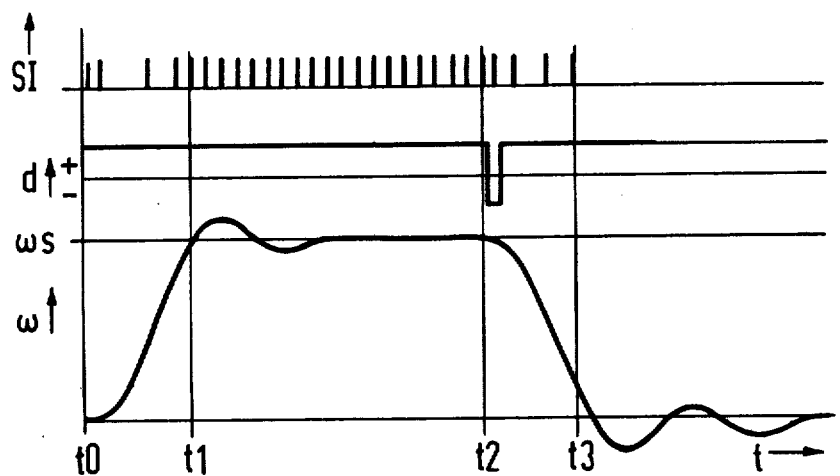
FIG. 1 illustrates a time diagram of the angular velocity and of the stepping pulse.

In FIG. 1 a time diagram is shown where the time t is represented as the abscissa and the corresponding values of the stepping pulses SI and the angular velocity $\omega$ of the stepper motor are shown as the ordinate.

Between the points in time $t_0$ and $t_1$ the stepper motor is accelerated from a rest position to an angular velocity of $\omega_s$. Initially two starting pulses are provided for the stepping pulses and in succession three control pulses during the acceleration. The repetition rate of the starting pulses is chosen such that it is considerably greater than the repetition rate of the control pulses at the beginning of the acceleration. At the point in time $t_1$ the angular velocity of the stepper motor has reached its desired value $\omega_s$ and a multitude of control pulses of equal repetition rate are generated.

During the time interval $t_2$ to $t_3$, the stepper motor is decelerated and the repetition rate of the stepping pulses SI is reduced accordingly. By the use of an additional negative stepping pulse after the point in time $t_2$ was reached, immediately the load angle range is selected which is optimal for the deceleration. In case the stepper motor is driven with the aid of an amplifier by means of a ring counter, the direction of rotation of the ring counter is reversed during the time period in which the negative stepping pulse is present. The direction of rotation is indicated in FIG. 1 by the letter d. Following the point in time $t_3$ the stepper motor comes to a stop in the form of a dampened oscillation.

Figure 2:
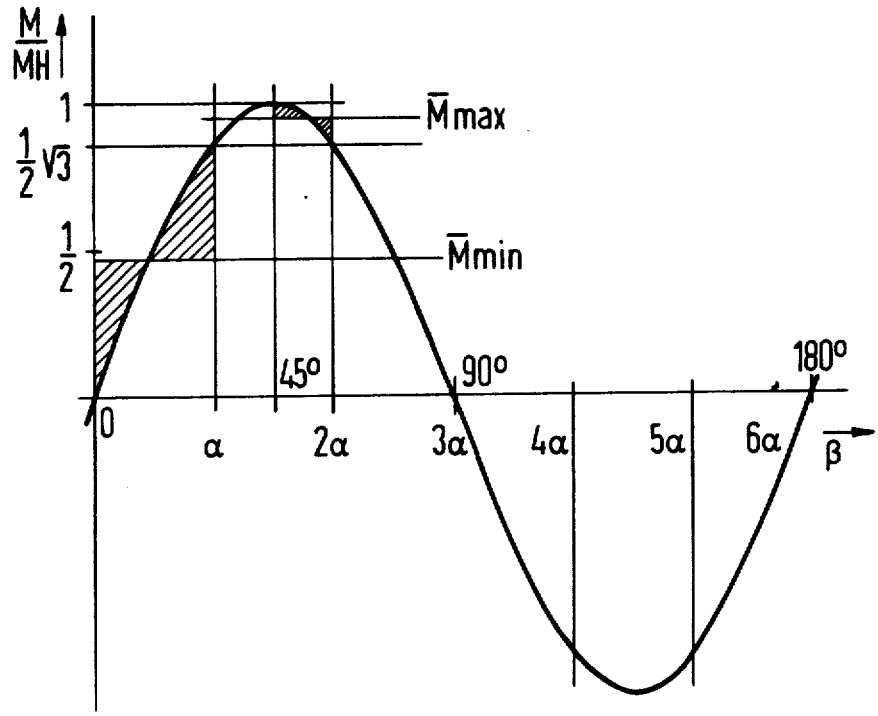
FIG. 2 illustrates a diagram of the static torque characteristic.

In FIG. 2 the indicated curve gives the static torque characteristic in dependence upon the load angle $\beta$ as the abscissa. Load angle is meant to be the particular angle by which the axle of a stepper motor turns if a particular static torque is applied in the loaded versus the unloaded position or the magnetic rest position. The motor receives at this period no control pulses. Along the ordinate of the XY-diagram, the static torque with respect to the stopping moment MH is indicated. The term stopping momentum is used to indicate the maximum torque which can be handled by an excited motor under static load without causing it to turn continuously. In the following it is assumed that the torque characteristic takes a sinusoidal shape.

The dynamic torque of the stepper motor is calculated from its static torque characteristic. The term dynamic torque is used to indicate the average torque which is available at the motor axle during rotation by an angle $\Delta\phi$. This is done with the assumption that each of the succeeding control pulses is initiated exactly after a rotation by one step. With the aid of the torque characteristic one can realize that the stepper motor when turned by the stepping angle $\alpha$ will have its maximum dynamic torque $\overline{M}$ max at the point when the load angle between two control pulses takes a symmetric shape to the peak value which is also the stopping momentum MH. By simple arithmetic the maximum dynamic torque is calculated as follows:

$$\overline{M}\text{max} = \frac{MH}{p \cdot \alpha} \cdot 2 \cdot \sin p \frac{\alpha}{2}$$

and the dynamic torque minimum is calculated to be $$\overline{M}\text{min} = \frac{MH}{p \cdot \alpha} \cdot [1 - \cos p\, \alpha]$$

where p denotes the number of poles of the stepper motor and $\alpha$ denotes the stepping angle.

During an investigation into the dependence of the repetition rate of the control pulses and the rotational angle $\phi$ of the rotor of a stepper motor with respect to time, if one wants to maintain a constant dynamic torque $\overline{M}$ driving the axle, it was found that when a stepper motor is started from a magnetic inactive position it will accelerate in the form of a uniform acceleration movement if the repetition rate "f" follows the equation $$f = \frac{\overline{M}\text{min}}{J} \cdot \frac{1}{\alpha} \cdot t$$

where J denotes the total inertia.

If the repetition rate "f" deviates from this equation and rises slower, then the rotor does not turn by the angle $\alpha$ in the time between two control pulses and the prerequisite for constant torque is no longer satisfied.

If the repetition rate "f" indeed increases linearly but more rapidly, it could happen that the motor will fall out of step after a couple of control pulses and stops because then the load angle $\beta$ exceeds the unstable equilibrium position in the stable torque characteristic.

In the case of a linear time increase of the repetition rate "f", the acceleration capability, as inherent in the stepper motor, is not used to its fullest extent because the difference between the minimum and the maximum dynamic torque can be very large. Fundamentally it is possible to accelerate a stepper motor using a repetition rate of the control pulses SI following the equation $$f = \frac{\overline{M}\text{max}}{J} \cdot \frac{1}{\alpha} \cdot t$$

However, this repetition rate represents the theoretical limit and this repetition rate "f" cannot be exceeded.

In the case where only very few steps are available for the speed up of a stepper motor, a linear increase of the repetition rate "f" is no longer satisfactory or not possible due to the few number of steps available. In this case it is no longer practical to increase the repetition rate "f" in the form of a monotonic increasing function but one has to look for new approaches to bring the load angle as quickly as possible into its optimum duty cycle which is determined by the equation $$\frac{\pi}{2p} - \frac{\alpha}{2} \leq \beta \leq \frac{\pi}{2p} + \frac{\alpha}{2}$$

In the time diagram according to FIG. 3 (whose time points $t_1$, $t_2$ differ from FIG. 1), the load angle $\beta$ is brought as fast as possible into the optimal range of operation by initiating during the points in time $t_0$ and $t_1$ two starter pulses which follow each other in a short time sequence. The time sequence is so short that the rotor of the stepper motor has during this time not rotated or rotated only very little in comparison to the magnitude of one single step. The number n of these starter pulses which follow each other immediately has to be chosen such that the load angle $$\beta 1 = \frac{\pi}{2p} + \frac{\alpha}{2}$$

is exactly reached or nearly reached in order to fulfill equation $$n \leq \frac{1}{\alpha} \left( \frac{\pi}{2p} + \frac{\alpha}{2} \right)$$

whereby n is an integer number. At the latest, the stepper motor will reach its top speed with the maximum acceleration momentum $\overline{M}$max at the time $t_2$ after $n+1$ start pulses were received. The time diagram shows in the direction of the ordinate the rotation angle $\phi$ in relation to the stepping angle $\alpha$.

In addition the stepping pulses SI are indicated which are generated by starting pulses during the time $t_0$ and $t_1$ and by control pulses after the point in time $t_2$ which indicate acceleration. In addition the repetition rate "f" of the stepper pulses is indicated. It can be recognized with the help of the time diagram that the repetition rate of the starter pulses is considerably greater than the repetition rate of the following control pulses.

In the case where, in accordance with the torque characteristic indicated in FIG. 2, an odd number of steps is required to cover a half period of the dynamic torque characteristic, the equal sign is valid in the last mentioned equation such that the number "n" of starter pulses can be calculated from the equation $$n = \frac{1}{\alpha} \cdot \left( \frac{\pi}{2p} + \frac{\alpha}{2} \right) = \frac{s+1}{2}$$

All additional control pulses are always generated at the moment when the rotor of the stepper motor has turned by an average of the stepping motor $\alpha$. The motor accelerates now linearly under maximum torque $\overline{M}max$.

In the case where, for example, a four pole motor (p=2) equipped with three conductor line windings is used and the stepping angle $\alpha$ is 30°, the number of starter pulses is given as n=2. To bring the motor up to speed, two starter pulses are therefore initiated at the start up. This case is illustrated in FIG. 3.

In the case where the number s is even, the number n is determined by the equation $$n = \frac{1}{\alpha} \cdot \frac{\pi}{2p} = \frac{s}{2}$$

The first successive control pulse is already initiated, contrary to the case where s is odd, at the point when the rotor has turned by only half a stepping angle. All additional control pulses are initiated such that maximum torque $\overline{M}max$ is reached. The stepper motor is thus working in its range of optimum load angle.

The stepper motor which has an even number for "s" can therefore be accelerated from start with the maximum possible torque $\overline{M}max$ in the same way as a stepper motor which has an odd number for "s".

In the case of deceleration of a stepper motor, which can be interpreted as a negative acceleration, corresponding approaches to the case of acceleration are valid.

In this case, the optimum load angle can be adjusted such that either a number of stepping pulses are left out or that a number of negative stepping pulses are initiated. The stepper pulses SI would usually control in a motor amplifier the ring counter, which in turn helps to activate the individual windings of the stepper motor. In the case where the ring counter would normally count in the positive direction it will count due to the negative stepping pulses during deceleration in a negative direction. In this manner the deceleration of the stepper motor is again accomplished with the maximum torque $\overline{M}max$ if the number of stepping pulses is chosen such that the $$\text{load angle}\,\beta = -\frac{\pi}{2} + \frac{\alpha}{2}$$

is most closely matched. The block diagram for the generation of stepping pulses for the drive of a stepper motor SM as illustrated in FIG. 4 contains the pulse generator TG, a switching stage SS, an amplifier V and the stepper motor SM. The pulse generator TG generates the clock pulses T of a predetermined repetition rate and inputs them to the switch stage SS. The switching stage generates the stepping pulses SI by means of the clock pulses T for the drive of the stepper motor SM. The stepping pulses SI are fed to the amplifier V which contains a ring counter which is switched with each stepping pulse to another position and which outputs by means of amplifier stages corresponding control voltages which are fed to the windings of a stepper motor SM.

The switching stage SS contains a multiplexer FT which has at its input the clock pulses T and at its output the stepping pulses SI. The multiplexer FT multiplies the repetition rate of the clock pulses T by a factor which is customarily smaller than one. This factor is determined by data words DW which are fed to the multiplexer by way of a memory SP. The multiplexer FT can be designed, for example, in such a fashion as to contain a counter which is set by a data word DW to a particular value and which is counted down by means of the control pulses. Each time the counter reaches the counter position 0 it will generate a stepping pulse SI and will be reset to a new value determined by the data word DW and again will be counted down. In the case where the value of the data word DW is very high a large number of control pulses are required to count again down to the counter position 0 and the repetition rate of the stepping pulses is very small. In the case where the value of the data word DW is low only a few clock pulses T are required and the repetition rate of the stepping pulses SI is correspondingly high.

The address input of memory SP is connected to the output of a counter stage ZS. The counter input of the counter stage ZS receives the stepping pulses SI. A control input of counter stages ZS is connected to the switch SW which initiates a signal to the counter stage ZS which determines the direction of counting in counter stage ZS.

In the case where the signal S has, for example, the binary value of one, the counter stages ZS will be counted upwards and otherwise downwards.

In the memory SP are stored the data words DW which correspond to the repetition rate "f" of the stepping pulses SI. These data words form a control program which determines the angular velocity of the stepper motor SM. In order to get the time-rate characteristic of the repetition rate "f" of the stepping pulses SI according to FIG. 1 or FIG. 3, the data words DW which are coordinated to the two starting pulses have a lower value and the data words DW which are coordinated to the corresponding control pulses have values which are proportional to the time sequence of the control pulses.

It is assumed that the counter stage ZS may have the counter position 0. The counter stage ZS initiates an address word for the memory which reads out under address O in memory SP the stored data word that corresponds to the first start pulse and relays it to the multiplexer FT. As soon as the first starter pulse is transformed to the stepping pulse SI at the point in time $t_0$, the counter position of the counter stage is also increased by one. Due to the new address word AD, the data word DW is read out of memory SP which is coordinated to the second starter pulse.

In corresponding fashion the counter stage ZS is switched further by the stepping pulses SI and the data words coordinated to the control pulses are read out and relayed to the multiplexer. The repetition rate of the stepping pulses SI is altered according to the data words DW in such a way that the time diagrams shown in FIG. 1 and FIG. 2 are satisfied.

As soon as the counter stage ZS has reached a predetermined maximum value it is not counted up any further and sends a constant address word AD to the memory SP. This also causes the read out of the same data word DW and the repetition rate of the stepping pulses to stay constant. As soon as the stepper motor SM should decelerate, the switch SW is closed and the counter stage ZS is counted downward by the next following stepping pulses SI. The memory SP can supply the identical data words DW as were used during acceleration. In memory SP, however, a deceleration program could also be stored which is different from the acceleration program and which makes sure that the stepper motor SM is also working in the range of optimum load angle during deceleration. As soon as the counter stage ZS reaches the counter position 0, further generation of stepping pulses is inhibited and the stepper motor SM remains at rest.

The control program for the stepper motor SM can also be generated in the switching stage SS with the aid of a shift register. The shift register is preadjusted, for example, corresponding to a control program, and the contents of the shift registers are switched under control of the clock pulses T. The preadjustment of the shift register is accomplished in such a fashion that always at the moment when a stepping pulse should be generated, a signal with the binary value of one is initiated at its output. During acceleration or deceleration of the stepper motor SM, signals with the binary value of 0 are initiated during one or several periods of the control pulses, in dependence with the repetition rate of the stepping pulses, and therefore no further stepping pulses SI are generated.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A circuit arrangement for the generation of stepping pulses for the acceleration of a stepper motor having a shaft, comprising: a pulse generator means for generating clock pulses; an amplifier means having an input connected to the stepping pulses and an output connected to the stepper motor and which outputs voltages in accordance with the stepping pulses; a switching stage means which receives said clock pulses and provides said stepping pulses, said switching stage means initiating at the start of the acceleration as stepping pulses starter pulses which bring the stepping motor to a substantially optimum torque prior to any significant rotation of the stepper motor shaft relative to a rotation for a single step of the stepper motor, a plurality of acceleration control pulses of increasing repetition rate following the starter pulses, a repetition rate of the starter pulses being substantially greater than a repetition rate of directly following acceleration control pulses, and a plurality of constant repetition rate control pulses being provided after the completion of acceleration of the stepper motor.

2. A circuit arrangement according to claim 1 wherein said stepper motor has a half period of its static torque characteristic corresponding to an odd number s of steps and the switching stage means provides a number of starter pulses equal to $(s+1)/2$.

3. A circuit arrangement according to claim 1 wherein the starter pulses bring the stepper motor to an optimum load angle where load angle is defined as an angle by which the stepper motor shaft turns if a particular static torque is applied in a loaded versus an unloaded position.

4. A circuit arrangement in accordance with claim 1 wherein the switching stage means initiates deceleration of the stepper motor by a number of stepping pulses which bring the stepper motor directly into an optimum negative load angle range according to its torque characteristic where load angle is defined as an angle by which the stepper motor shaft turns if a particular static torque is applied in a loaded versus unloaded positions.

5. A circuit arrangement in accordance with claim 1 wherein the switching stage means comprises a memory having the number and repetition rate of the start pulses and of the control pulses in a corresponding control program.

6. A circuit arrangement in accordance with claim 5 wherein the control program is stored in a read only memory as data words which determine a divider ratio used to divide with the help of a multiplexer the repetition rate of the control pulses T generated in the pulse generator TG.

7. A circuit arrangement for the generation of stepping pulses for the acceleration of a stepper motor having a shaft, comprising:
   (a) a pulse generator means for generating clock pulses;
   (b) a multiplexer means connected to receive the clock pulses and output the stepping pulses to the stepper motor; and
   (c) memory and counter stage means connected to the multiplexer means for providing data words thereto said data words establishing a sequence of the stepping pulses at a start of acceleration of the stepper motor, said sequence comprising starter pulses which bring the stepping motor to a substantially optimum torque prior to any significant rotation of the stepper motor shaft relative to a rotation for a single step of the stepper motor, a plurality of acceleration control pulses of increasing repetition rate following the starter pulses, a repetition rate of the starter pulses being substantially greater than a repetition rate of directly following acceleration control pulses, and a plurality of constant repetition rate control pulses being provided after the completion of acceleration of the stepper motor.

8. A method for the acceleration of a stepper motor having a shaft, comprising the steps of:
   (a) generating clock pulses of a predetermined duration period;
   (b) modifying the clock pulses during acceleration by use of a multiplexer having data words fed thereto, the clock pulses being modified to create a sequence of stepping pulses for driving the motor during acceleration, said sequence comprising providing starter pulses which bring the stepping motor to a substantially optimum torque prior to any significant rotation of the stepper motor shaft relative to a rotation for a single step of the stepper motor, a plurality of acceleration control pulses of increasing repetition rate following the starter pulses, a repetition rate of the starter pulses being substantially greater than a repetition rate of directly following acceleration control pulses, and a plurality of constant repetition rate control pulses after the completion of acceleration of the stepper motor.

* * * * *